United States Patent [19]

Hess et al.

[11] Patent Number: 4,595,725

[45] Date of Patent: Jun. 17, 1986

[54] UNSATURATED POLYESTER RESINS, A PROCESS FOR THEIR PRODUCTION AND THEIR USE FOR THE PRODUCTION OF MOLDING COMPOSITIONS

[75] Inventors: Bernhard Hess, Moers; Bert Brassat; Bernhard Peltzer, both of Krefeld, all of Fed. Rep. of Germany

[73] Assignee: Bayer Aktiengesellschaft, Leverkusen, Fed. Rep. of Germany

[21] Appl. No.: 712,235

[22] Filed: Mar. 15, 1985

[30] Foreign Application Priority Data

Mar. 27, 1984 [DE] Fed. Rep. of Germany ....... 3411150

[51] Int. Cl.$^4$ ...................... C08G 63/76; C08G 63/52; C08G 63/54

[52] U.S. Cl. ........................................ 525/33; 525/36; 525/40; 525/440; 528/288; 528/303; 528/304

[58] Field of Search ..................... 525/33, 36, 40, 440; 528/288, 303, 304

[56] References Cited

U.S. PATENT DOCUMENTS

| | | | |
|---|---|---|---|
| 3,923,928 | 12/1975 | Atkins et al. | 525/40 |
| 3,957,906 | 5/1976 | Buzbee et al. | 525/40 |
| 3,969,311 | 7/1976 | Kubota | 525/40 X |
| 3,994,853 | 11/1976 | Hindersinn et al. | 525/33 X |
| 4,006,272 | 2/1977 | Sakaguchi et al. | 528/303 X |
| 4,251,641 | 2/1981 | Arakawa et al. | 525/36 |

*Primary Examiner*—Lucille M. Phynes
*Attorney, Agent, or Firm*—Connolly & Hutz

[57] ABSTRACT

Certain unsaturated polyester resins, so-called soft resins, having certain parameters are suitable for the production of hardened moldings of high elasticity.

16 Claims, No Drawings

UNSATURATED POLYESTER RESINS, A PROCESS FOR THEIR PRODUCTION AND THEIR USE FOR THE PRODUCTION OF MOLDING COMPOSITIONS

This invention relates to polyester resins based on α,β-ethylenically unsaturated polyesters and monomers copolymerizable therewith, to a two-stage process for their production and to their use for the production of molding compositions, particularly thickened resin mats and dough-like molding compositions.

Hardened glass-fiber-reinforced moldings produced from normal unsaturated polyester resins creak under flexural stress which is indicative of structural damage. Although polyester resins intended to elasticize highly unsaturated polyester resins giving extremely hard moldings are commercially available, the acid component of the polyesters of these resins consists of a high proportion of adipic acid and a relatively small proportion of maleic acid (anhydride). The hardened moldings produced with such polyesters are generally brittle, i.e. any attempt to bend them results in breakage. Accordingly, these resins are not suitable for use as sole polyester component.

Accordingly, the object of the invention is to provide unsaturated polyester resins which may be hardened, even at low temperature, without an additional elasticizing resin to form elastic moldings of high impact strength.

It has now been found that, depending upon their type and quantity and, possibly, upon the position of the residues in the polyester molecule, upon the ratios between the co-condensed residues and upon the molecular weight, the acid number and the hydroxyl number of the resulting polyester, a range of esterification components leads to products which have these desired properties.

The present invention provides unsaturated polyester resins of
A. from 30 to 70 parts by weight of α,β-ethylenically unsaturated polyester and
B. from 30 to 70 parts by weight of a monomer copolymerizable with A, polyester A being a reaction product of
(a) at least one of α,β-ethylenically unsaturated dicarboxylic acid and/or its anhydride,
(b) at least one hydrogenated phthalic acid and/or its anhydride,
(c) at least one ether glycol,
(d) at least one branching agent,
(e) optionally other carboxylic acids,
(f) optionally other alcohols and
(g) optionally polyisocyanate, characterised in that the content of fumaric acid residues amounts to at least 15 mole % and preferably to between 30 and 90 mole %, based on the dicarboxylic acid residues (a),
the content of dicarboxylic acid residues (a) amounts to at most 30 mole % and preferably to at most 20 mole %, based on the sum of the polycarboxylic acid residues,
the content of ether glycol residues correspondingly amounts to between 0.2 and 0.5 mole of ether groups per 100 g of polyester A,
the content of residues of co-condensed branching agents amounts to between 1 and 15 mole %, based on the sum of the alcohol residues,
the content of resdues of other acids and other alcohols amounts in each case to between 0 and 15 mole %, based on the sum of all the acid and alcohol residues,
the urethane group content amounts to between 0 and 0.05 mole per 100 g of polyester A,
the acid number of polyester A is less than 50 and preferably less than 35 and
the hydroxyl number of polyester A is less than 70 and preferably less than 50.

The products obtainable by hardening the resins according to the present invention are so elastic that a 2 mm thick test bar produced therefrom may be repeatedly bent at the same place without breaking. By virtue of this elasticity, no creaking occurs in glass-fiber-reinforced moldings which indicates that the structure is not damaged under flexural stressing. In addition, the glass-fiber-reinforced moldings show a smooth, splinter-free edge on breakage whereas, in state-of-the art moldings, the resin matrix breaks first, after which the fracture runs along the glass fibers and forms splinters.

The higher the monomer content, the higher the content of ethyl glycol residues and the lower the degree of branching of polyester A, then the greater the elasticity of the hardened moldings. The quantity of branching agent provides the hardened, fiber-reinforced product with the requisite flexural strength and dimensional stability under heat; the ether glycols impart high elasticity.

If, instead of the residues of hydrogenated phthalic acids, the polyesters contain adipic acid residues, for example, the hardened moldings are too elastic so that, after thermal hardening, they cannot be removed from their molds without deformation. If the polyesters contain insufficient fumarate residues, but maleate residues instead, brittle and, hence, technically useless products are formed during thermal hardening after thickening with chemical thickeners, for example magnesium oxide.

The fact that polyester resins of the type according to the invention have not hitherto been used as starting resins for the production of resin mats and dough-like molding compositions is attributable to a prejudice which exists against the use of these soft resins, i.e. it had not been considered possible that polyester resins, which in the absence of fillers and glass fibers give hardeneing products having a stability under thermal load of the order of 30° C. would give resin mats and dough-like molding compositions which can be molded at around 150° C. and which, after hardening at that temperature, can be removed from the molds used without deformation. The glass-fiber-reinforced moldings produced from the resins according to the present invention surprisingly show dimensional stabilities under heat of, in some cases, far above 200° C. and a modulus of elasticity of the order of 4000 MPa (cf. Table 3 of the Examples).

Unsaturated dicarboxylic acids or their anhydrides (a) preferably used for the production of polyester A are those containing 4 or 5 carbon atoms, for example, maleic or citraconic acid anhydride and fumaric acid.

Hydrogenated phthalic acids or their anhydrides (b) preferably used for the production of polyester A are tetra- and hexahydrophthalic acid, methylated tetra- and hexahydrophthalic acid and also endomethylene tetrahydrophthalic acid, hexachloroendomethylene tetrahydrophthalic acid or the anhydrides of the abovementioned compounds. Tetra- and hexahydrophthalic acid and their anhydrides are particularly preferred.

Ether glycols (c) preferably used for the production of polyester A are di-, tri- and polyethylene glycol and also di, tri- and polypropylene glycol; the polyglycols may contain on average from 4 to 20 ethyleneoxy or propyleneoxy groups.

Branching agents (d) preferably used for the production of polyester A are, for example, polycarboxylic acids, corresponding to the following formula:

in which A is an x-functional, optionally substituted aliphatic radical preferably containing from 2 to 20 carbon atoms, a cycloaliphatic radical preferably containing from 5 to 16 carbon atoms, an araliphatic radical preferably containing from 7 to 20 carbon atoms, an aromatic radical preferably containing from 6 to 15 carbon atoms or an aromatic or cycloaliphatic $C_2$–$C_{12}$-radical containing heteroatoms, such as N, O or S, in the ring and x is an integer of from 3 to 6, preferably 3 or 4, for example trimellitic acid, trimesic acid, pyromellitic acid, butane tetracarboxylic acid, ethylene tetracarboxylic acid and tricarbalkylic acid; polyols corresponding to the following formula:

in which B is an a-functional aliphatic radical preferably containing from 3 to 20 carbon atoms, a cycloaliphatic radical preferably containing from 5 to 16 carbon atoms, an araliphatic radical preferably containing from 7 to 20 carbon atoms, an aromatic radical preferably containing from 6 to 15 carbon atoms and a $C_2$–$C_{12}$-heterocyclic radical containing N, O or S preferably containing from 2 to 12 carbon atoms and a is an integer of from 3 to 6, preferably 3 to 4, for example trimethylol ethane and propane, glycerol, pentaerythritol, 1,2,6-hexane triol, mannitol, sorbitol, tris-hydroxyalkylisocyanurate and alkyltriazolidin-3,5-diones; hydroxy carboxylic acids corresponding to the following formula:

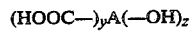

in which A is as previously defined and y and z independently of one another are each an integer of from 1 to 3, preferably 1 or 2, with the proviso that the sum of y+z is at least 3, for example malic acid, citric acid, tartaric acid and hydroxybenzene dicarboxylic acids.

"Other" carboxylic acids (e) which may optionally be used for the production of polyester A are, preferably, aliphatic dicarboxylic acids containing from 2 to 12 carbon atoms and cycloaliphatic saturated and unsaturated and aromatic dicarboxylic acids containing from 8 to 12 carbon atoms. The corresponding anhydrides may of course also be used. Preferred "other" carboxylic acids are, for example, phthalic acid or phthalic acid anhydride, isophthalic acid, terephthalic acid, succinic acid, and succinic acid anhydride and succinic acid esters, adipic acid, sebacic acid. To produce substantially non-inflammable resins, it is possible for example to use tetrachlorophthalic acid or tetrabromophthalic acid.

"Other" alcohols (c) which may optionally be used for the production of polyester A are preferably diols containing from 2 to 8 carbon atoms, for example ethylene glycol, 1,2-propane diol, 1,3-propane diol, 1,3-butane diol, 1,4-butane diol, 1,6-hexane diol, 2,2-bis-(4-hydroxycyclohexyl)-propane, bis-alkoxylated bisphenol A and perhydrobisphenol.

Polyisocyanates which may optionally be used for the production of polyester A are, preferably, aliphatic, cycloaliphatic and aromatic diisocyanates containing from 6 to 18 carbon atoms, for example 1,6- hexamethylene diisocyanate, 2,4'- and 4,4'-dicyclohexyl-methane diisocyanate, "isophorone" diisocyanate, 2,4- and 2,6-tolylene diisocyanate, 2,4'- and 4,4'-diphenylmethane diisocyanate and mixtures thereof and also higher polyisocyanates of which the functionality has been reduced to 2 by reaction with the compounds capable of reacting with isocyanates (for example monohydric alcohols).

Polyester A may be produced from the starting componenets continuously or in batches, optionally in the presence of esterification catalysts, at 140° to 260° C. and preferably at 160° to 240° C. using known methods, for example melt condensation or azeotropic methods.

In one preferred embodiment, a branched precondensate, at least 85 mole % of whose acid residues consist of residues of component (b) and which contains residues of co-condensed branching agent (d) in a proportion corresponding to between 1 and 15 mole %, based on the sum of the alcohol residues, is prepared in a first step from components (b), (c) and (d), optionally (e) and optionally (f), the sum of the acid number and the hydroxyl number amounting to between 50 and 120 and at least half that sum being contributed by the hydroxyl number; component (a) is condensed onto the precondensate thus prepared with the proviso that either fumaric acid is used as component (a) or, where maleic acid (anhydride) is used, cis-/trans-isomerization can take place to the necessary extent (for example in the presence of isomerization catalysts or at elevated temperature).

The maximum quantity of component (a) used in this embodiment amounts to 1 mole and preferably to between 0.2 and 0.7 mole per mole of hydroxyl in the precondensate.

The first step of the process may be carried out at 160° to 240° C. and preferably at 180° to 220° C. and the second step at 120° to 220° C. and preferably at 180° to 210° C.

The effect of this embodiment of the process according to the invention is that the residues of the dicarboxylic acid (a) are not statistically distributed in the polyester, but instead are mostly situated at the chain ends of the polyester molecules. The polyesters thus produced give more elastic hardening products by comparison with polyesters in whose production the total quantity of component (a) is added right at the beginning of the reaction, so that the double bonds are statistically distributed.

If desired, the resulting polyester may be reacted with polyisocyanate (g) either in the melt or after dissolution in monomer B, resulting in an increase in molecular weight. The quantity of polyisocyanate is best determined by experiment because the first-stage polyester is already branched and gelation readily occurs on reaction with polyisocyanate. However, the reaction product should be free from reactive isocyanate groups to ensure that the end product remains sufficiently stable in storage.

In the context of this invention, acid residues are understood to be the residues of the acids reduced by the hydroxyl residues of the carboxyl groups, i.e. for example -OC-R-CO-, whilst alcohol residues are understood to be in the residues of the alcohols reduced by the hydrogen atoms, i.e. for example -O-R-O.

The polyesters A generally have molecular weights determined as number averages $M_n$ of from 300 to 5000 and preferably from 400 to 3000 (as measured by vapor pressure osmometry in dioxane and acetone; in the event of differing values, the lower value is regarded as the correct value).

Suitable monomers B copolymerizable with the unsaturated polyesters A are the unsaturated compounds commonly encountered in polyester technology which preferably contain α-substituted vinyl groups or β-substituted allyl groups, preferably styrene, but also for example nuclear-chlorinated and -alkylated or -alkenylated styrenes, the alkenyl or alkyl moieties containing from 1 to 4 carbon atoms. for example vinyl toluene, divinyl benzene, α-methylstyrene, tert.-butyl styrene, chlorostyrenes; vinyl esters of carboxylic acids containing from 2 to 6 carbon atoms, prefearbly vinyl acetate; vinyl pyridine, vinyl naphthalene, vinyl cyclohexane, acrylic acid and methacrylic acid and/or esters thereof (preferably vinyl, allyl and methallyl esters) containing from 1 to 4 carbon atoms in the alcohol component, allyl compounds, such as allyl benzene, and allyl esters, such as allyl acetate, phthalic acid diallyl esters, isophthalic acid diallyl ester, fumaric acid diallyl ester, allyl carbontes, diallyl carbonates, triallylphosphate, triallyl cyanurate and also diallyl ethers.

In order to protect the polyester resins according to the invention against undesirable premature polymerization, it is advisable to add polymerization inhibitors or antioxidants during their actual production. Suitable auxiliaries of this type are described, for example, in "Methoden der Organischen Chemie" (Houben-Weyl), 4th Edition, Vol. XIV/1, Pages 433–452, Georg Thieme-Verlag, Stuttgart, 1961. One example of a particularly suitable auxiliary of this type is hydroquinone used in a concentration of from 0.01 to 0.05 part by weight, based on polyester resin (A+B).

The oxides and hydroxides of metals of the Second Main Group of the Periodic System known as chemical thickeners, preferably the oxides and hydroxides of magnesium and calcium, but also for example of zinc, and also additives which accelerate or regulate chemical thickening, such as 0.1 to 0.5 part by weight of water, or the additives according to DE-OS 15 44 891, for example aliphatic carboxylic acids or partial phosphoric acid esters, may be added in effective quantities to the polyester resins according to the invention.

The usual quantities of polymerization initiators are added to the polyester resins according to the invention at any time before thickening. Suitable polymerization initiatores are, for example, diacyl peroxides, diacetyl peroxides, dibenzoyl peroxide, di-p-chlorobenzoyl peroxide, peroxy esters, such as tert.-butyl peroxyacetate, tert.-butyl peroxybenzoate, tert.-butyl peroctoate, dicyclohexyl peroxydicarbonate or 2,5-dimethylhexane-2,5-diperoctoate, alkyl peroxides, such as bis-(tert.-butylperoxybutane), dicumyl peroxide, tert.-butyl cumyl peroxide, di-tert.-butyl peroxide, hydroperoxides, such as cumene hydroperoxide, tert.-butyl hydroperoxide, cyclohexanone hydroperoxide, methyl ethyl ketone hydroperoxide, perketals, ketone peroxide, such as acetyl acetone peroxide and azoisobutyrodinitrile.

Preferred reinforcing fibers are inorganic fibers, such as metal, asbestos, carbon fibers, particularly glass fibers, and organic fibers, for example cotton, polyamide, polyester, polyacrylonitrile or polycarbonate fibers.

Preferred inorganic fillers are chalk, talcum, quartz powder and ground shale, kaolin, lime spar, dolomite, mica, heavy spar, kieselguhr and aluminas, Standard auxiliaries and additives which may be used include, for example, organic and inorganic pigments, dyes, lubricants and release agents, such as zinc stearate, thixotropizing agents, UV-absorbers, particularly shrinkage-reducing additives (DE-PS 1 694 857, 1 953 062), for example homopolymers, copolymers and graft polymers of styrene and its derivatives, ethylene, vinyl acetate, (meth) acrylic acid and esters thereof, and also cellulose esters, polycondensates and poly-addition compounds used in quantities of from 1 to 30% by weight and preferably in quantities of from 3 to 15% by weight, based on polyesters resin (A+B).

The most effective method of producing the resin mats is intensively to mix the unsaturated polyester resins (A+B) according to the invention with the other components, except for the reinforcing fibers, in dissolvers or on roll stands and to impregnate reinforcing fibers laid out in sheet form, even in the form of mats or woven structures, with the resulting mixture. The surfaces of the resin mats thus produced are protected on both sides by masking films. The films prevent the monomers B from evaporating and enable the mats to be rolled up and, hence, stored in a compact manner. After a thickening time of 1 to 2 days at room temperature, the masking films may be withdrawn and the resin mats, after cutting to the appropriate shape, may be compression-molded for about 0.5 to 5 minutes (depending on size and shape) at about 120° to 160° C. under a pressure of from about 20 to 160 bars. These resin mats may be stored for about 3 months at room temperature and may be compression-molded without difficulty during that time. Their thickening time may of course even be accelerated by storage at elevated temperature, for example 50° C.

Dough-like molding compositions, also known as "Sauerkraut" molding compositions, are similarly produced, i.e. a very finely dispersed fiber-free mixture of the components, except the fibers, is initially prepared using dissolvers or roll stands and subsequently mixed with fibers, generally glass fibers, in kneaders. In the interests of simplicity, all the components, including the fibers, are often mixed in kneaders. The molding compositions are ready for compression-molding after storage for 1 to 3 days at room temperature.

EXAMPLES

The compositions and characteristics of the unsaturated polyester resins UP 1 to UP 3 according to the invention and of the comparision polyester CP 1 are shown in Table 1 below. The percentages quoted represent percentages by weight. The viscosities quoted were measured at 20° C. using a Hoeppler falling-ball viscosimeter. The figures in brackets represent moles and the preceding figures parts by weight.

Abbreviations:

| | |
|---|---|
| MSA | maleic acid anhydride |
| THPSA | tetrahydrophthalic acid anhydride |
| EG | ethylene glycol |
| DiEG | diethylene glycol |
| TriEG | triethylene glycol |
| TMP | trimethylol propane |
| TDI | tolylene diisocyanate |
| A No. | Acid number of the resin in mg of KOH/g |
| OH No. | OH number of the resin in mg of KOH/g (acetyl- |

-continued

| Abbreviations: | |
|---|---|
| | ation method) |
| NCO | g of reactive NCO per 100 g of resin |
| Mole O | moles of oxygen per 100 g of resin |
| Visc. 65 | viscosity of a 65% by weight solution in styrene in mPa.s at 20° C. |
| Bending Test A | hardened 65% by weight solution in styrene without any MgO added |
| Bending test B | hardened 65% by weight solution in styrene with MgO added (for test procedure, see under "Production of the unsaturated polyester resins") |

TABLE 1

| | | UP 1 | UP 2 | UP 3 | CP 1 |
|---|---|---|---|---|---|
| 1st stage | THSPA | 152.0 (1.0) | 152.0 (1.0) | 152.0 (1.0) | 152.0 (1.0) |
| | EG | 24.8 (0.4) | — | 31.0 (0.5) | — |
| | DiEG | — | 108.1 (1.02) | 58.3 (0.55) | — |
| | TriEG | 97.5 (0.65) | — | — | 150.0 (1.05) |
| | TMP | 13.4 (0.1) | 13.4 (0.1) | 13.4 (0.1) | 13.4 (0.1) |
| | | 287.7 | 273.5 | 254.7 | 315.4 |
| | Water (-) | 18.0 | 18.0 | 18.0 | 18.0 |
| | | 269.7 | 255.5 | 236.7 | 297.4 |
| 2nd stage | MSA | 14.7 (0.15) | 14.7 (0.15) | 14.7 (0.15) | 14.7 (0.15) |
| 3rd stage | TDI | 4.4 (0.025) | 4.4 (0.025) | 4.4 (0.025) | 4.4 (0.025) |
| | Characteristics | | | | |
| 1st stage | A No. | 6 | 5 | 6 | 7 |
| | OH No. | 83 | 68 | 95 | 90 |
| 2nd stage | A No. | 25 | 28 | 28 | 24 |
| | OH No. | 45 | | 50 | |
| | Visc. 65 | 550 | 930 | 720 | 429 |
| 3rd stage | A No. | 25 | 28 | 28 | 24 |
| | Visc. 65 | 866 | 1350 | 1260 | 640 |
| | NCO | 0 | 0 | 0 | 0 |
| | Mole O | 0.45 | 0.37 | 0.22 | 0.62 |
| | Properties after hardening | | | | |
| | Bending test A | 35 | 25 | 10 | Rubber, no strength! |
| | Bending test B | 28 | 13 | 3 | |

I. Production of the unsaturated polyester resins

The unsaturated polyesters were produced by melt condensation in a sitrrer-equipped vessel provided with a descending condenser.

1st and 2nd stage:

After the esterification components of the 1st stage had been weighed in, they were heated under nitrogen to 160° C. and kept at that temperature for 2 hours. The temperature was then increased to 230° C. over a period of 9 hours. Esterification was carried out at that temperature until the characteristics of the 1st stage as indicated in the Table had been reached. The melt was then cooled to 160° C., 0.02% by weight, based on the melt, of hydroquinone and then MSA were added and the mixture was subsequently heated under nitrogen for 2 hours to 200° C. After 2 hours at 200° C., the melt was cooled to 110° C. and dissolved to form a 65% by weight solution in styrene containing 0.03% by weight, based on the melt, of di-ter.-butyl quinone.

3rd stage:

TDI was stirred into the styrene solution cooled to 70° C. and the mixture was kept at 75° C. for 3 hours. Thereafter, the NCO-content had fallen to >0.05% and the product was cooled to room temperature. The 65% by weight polyester resins are additionally identified by (II) after the 2nd stage and by (III) after the 3rd stage.

Bending test A:

1% by weight of desensitized tert.-butyl perbenzoate was added to the 65% by weight polyester resin. The resin was then cast between two glass plates separated by a gap of 2 mm and hardened for 1 hour at 80° C., followed by tempering for 15 hours at 100° C. The plate cooled to room temperature was then removed from the plate mold, cut into 5 mm wide strips and the strips thus obtained were bent by hand through 180° at the same place. The number of times the plates were bent before breaking is shown in Table 1 under "bending test A".

Bending test B:

Bending test B differed from bending test A in that, before addition of the peroxide, 1.5% by weight of MgO was stirred in and the polyester resins were thickened for 24 hours at room temperature before hardening.

II. Production of resin mats

Quantities of 1000 g of polyester resins UP 1 to UP 3 and CP 1 were homogeneously mixed in a dissolver with the additives shown in Table 2. Glass fibers were impregnated with the resins which were then compressed between masking films to form resin mats. The resin mats were ripened for 2 days at 23° C. and then compression molded at 150° C. to form 4 mm thick plates. Standard bars were cut from the hardened plates and their mechanical strengths were determined. They are compared in Table 3 with the values obtained with a clear resin plate hardened and tempered as described under "bending test A".

TABLE 2

| Resin mat formulation |
|---|
| 1000.0 g of polyester solution UP 1 to 3 and CP 1 |
| 0.2 g of benzoquinone |
| 1000.0 g of chalk |
| 40.0 g of zinc stearate |
| 15.0 g of MgO |
| 10.0 g of tert.-butyl perbenzoate |
| Glass content of the resin mat: approx. 25% by weight |

TABLE 3

Properties of UP 2 (II.) and UP 2 (III.) as a cast clear resin plate and as a compression-molded resin mat plate

|  | Cast clear resin plate | | Compression-molded resin mat plate |
| --- | --- | --- | --- |
|  | UP 2 (II.) without MgO | UP 2 (III.) without MgO | UP 2 (III.) with MgO |
| Glass content (%) | — | — | 25 |
| Dimensional stability under heat (°C.) (ISO/R 75/meth. A) | 29 | 30 | 210 |
| Tensile strength (MPa) | 18 | 17 | 90 |
| Breaking elongation (%) | 131 | 153 | 2.4 |
| E-modulus (tensile test, MPa) |  |  | 5700 |
| Impact strength(kJ/m$^2$) at |  |  |  |
| ≦° C. |  |  | 87 |
| −20° C. |  |  | 87 |
| −30° C. |  |  | 106 |

It is remarkable that there was no reduction in impact strength in the low-temperature test; there was no creaking before breakage in the tensile test and that the dimensional stability under heat of the compression-molded resin mat plate at molding temperatures of 150° C. was sufficient for mold release without deformation at molding temperatures of 150° C.

TABLE 4

Properties of resin mat compression moldings of UP 1 (III.) to UP 3 (III.) and CP 1 (III.)

| Resin base | UP 1 (III.) | UP 2 (III.) | UP 3 (III.) | CP 1 (III.) |
| --- | --- | --- | --- | --- |
| Glass content (%) | 25.3 | 25.3 | 25.3 | 25.3 |
| Breaking elongation (MPa) | 111 | 160 | 164 | 57 |
| Peripheral fiber elongation (%) | 4.5 | 4.3 | 3.8 | 3.3 |
| E-modulus (MPa) | 3451 | 4592 | 5640 | 2837 |
| Impact strength in kJ/m$^2$ |  |  |  |  |
| at +23° C. | 103 | 87 | 91 | 100 |
| −30° C. | 106 | 106 | 102 | 105 |
| Barcol hardness | 67 | 77 | 82 | 28 |

The values shown in Table 4 illustrate the advantages of the resins according to the invention over the comparison mixture CP 1 (III) which, even in the form of a glass-fiber-reinforced compression molding, shows very low tensile strength, a low E-modulus and poor Barcol hardness. In the bending test, none of the compression moldings creaked before breakage or showed any reduction in impact strength at low temperatures. Accordingly, by virtue of their high stiffness in flexure and their flexibility without creaking, compression moldings obtained from the resins according to the invention are able advantageously to replace sheet metal for a variety of applications.

We claim:

1. An unsaturated polyester resin comprising
   A. from 30 to 70 parts, by weight of the resin, of α,β-ethylenically unsaturated polyester and
   B. from 30 to 70 parts, by wieght of the resin, of monomer copolymerizable with polyester A, where polyester A is comprised of residues formed by the reaction of
   (a) at least one α,β-ethylenically unsaturated dicarboxylic acid and/or its anhydride,
   (b) at least one hydrogenated phthalic acid and/or its anhydride,
   (c) at least one ether glycol,
   (d) at least one branching agent, and where the dicarboxylic acid residues (a) are comprised of at least 15 mole % fumaric acid residues, based on dicarboxylic acid residues (a), the content of dicarboxlylic acid residues (a) amounts to at most 30 mole %, based on the sum of the polycarboxylic acid residues, the content of ether glycol residues amounts to between 0.2 and 0.5 moles of ether groups per 100 g of polyester A, the content of branching agent residues amounts to between 1 and 15 mole %, based on the sum of the alcohol residues, the acid number of polyester A is less than 50 and hydroxyl number of polyester A is less than 70.

2. A polyester resin as claimed in claim 1, wherein the dicarboxylic acid residues (a) are comprised of between 30 and 90 mole % fumaric acid residues, based on dicarboxylic acid residues (a).

3. A polyester resin as claimed in claim 1, wherein the content of carboxylic acid residues (a) amounts to at most 20 mole %, based on the sum of the polycarboxylic acid residues.

4. A polyester resin as claimed in claim 2, wherein the content of carboxylic acid residues (a) amounts to at most 20 mole %, based on the sum of the polycarboxylic acid residues.

5. A polyester resin as claimed in claim 1, wherein the acid number of polyester A is less than 35.

6. A polyester resin as claimed in claim 2, wherein the acid number of polyester A is less than 35.

7. A polyester resin as claimed in claim 3, wherein the acid number of polyester A is less than 35.

8. A polyester resin as claimed in claim 4, wherein the acid number of polyester A is less than 35.

9. A polyester resin as claimed in claim 1 wherein the hydroxyl number of polyester A is less than 50.

10. A polyester resin as claimed in claim 1 further comprising
    (e) other carboxylic acids and (f) other alcohols wherein the content of residues of other acids and other alcohols amounts to at most 15 mole %, based on the sum of all the acid and alcohol residues.

11. A polyester resin as claimed in claim 1 further comprising, (g) a polyisocyanate, wherein the urethane group content amount up to at most 0.05 mole per 100 g of polyester A.

12. A process for producing the polyester resins claimed in 1 comprising in a first stage, producing from components (b), (c) and (d) a branched precondensate, where at least 85 mole % of the acid residues comprise residues component of (b), where the branched precondensate contains from 1 to 15 mole % branching agent residues, based on the sum of the alcohol residues, and where the sum of the acid and hydroxyl numbers in the branched precondensate amount to between 50 and 120, at least half that sum being contributed by the hydroxyl number; then in a second stage condensing component (a) onto the precondensate with the proviso that either fumaric acid is used as component (a) or, where maleic acid (anhydride) is used, a cis-/trans-isomerization can take place to the necessary extent.

13. A process for producing the polyester resins claimed in 10 comprising in a first stage, producing from components (b), (c), (d) and (e) a branched precondensate, where at least 85 mole % of the acid residues comprise residues of component (b), where the branched precondensate contains from 1 to 15 mole % branching agent residues, based on the sum of the alcohol residues, and where the sum of the acid and hydroxyl numbers in the branched precondensate amount to between 50 and 120, at least half that sum being contributed by the hydroxyl number; then in a second stage condensing component (a) onto the precondensate with the proviso that either fumaric acid is used as component (a) or, where maleic acid (anhydride) is used, a cis-/trans-isomerization can take place to the necessary extent.

14. A process as claimed in claim 12 wherein from 0.2 to 0.7 mole of component (a) is used per mole of hydroxyl in the precondensate.

15. A process as claimed in claim 12 wherein that the first stage of the process is carried out at 180° to 220° C.

16. The use of the polyester resins claimed in claim 1 for the production of thickened resin mats and dough-like molding compositions.

* * * * *